United States Patent [19]
Gibbs

[11] 3,817,305
[45] June 18, 1974

[54] CUTTER TIP
[75] Inventor: Wallace E. Gibbs, Splendora, Tex.
[73] Assignees: I. W. Ferguson; J. W. McNaughton, both of Splendora, Tex. ; part interest to each
[22] Filed: Oct. 19, 1972
[21] Appl. No.: 298,850

[52] U.S. Cl. ................... 144/231, 29/102, 144/172, 144/218, 144/230, 241/191, 241/292
[51] Int. Cl. ........................................... B27g 13/00
[58] Field of Search ........... 144/156, 172, 173, 218, 144/236, 227, 230, 231, 116, 326, 323, 176; 241/191, 292, 295, 92; 29/101, 102

[56] References Cited
UNITED STATES PATENTS

| | | | |
|---|---|---|---|
| 1,575,315 | 3/1926 | Bowman | 29/101 |
| 2,449,605 | 9/1948 | Kelton | 144/230 |
| 2,825,371 | 3/1958 | Forman | 144/172 X |
| 3,346,028 | 10/1967 | Mitten | 144/172 X |
| 3,356,114 | 12/1967 | Noel | 144/218 X |
| 3,487,865 | 1/1970 | Chapman et al | 144/237 X |

*Primary Examiner*—Andrew R. Juhasz
*Assistant Examiner*—W. D. Bray
*Attorney, Agent, or Firm*—Donald Gunn

[57] ABSTRACT

A removable and replacable cutting tip which is readily dressed after wearing for use in a profile cutter wherein the tip is preferably formed of circular stock and is dressed by grinding to an edge along only one face which intersects one of the two curved faces of the circular stock. The cutting tip is locked in position to expose a cutting edge. As the edge wears, the cutting tip is removed and dressed by grinding along one face only. The one face intersects one of the naturally formed curved or cylindrical surfaces, keeping in view that the apparatus is formed of circular stock. Slots are included for ready mounting on a profiling head.

9 Claims, 3 Drawing Figures

PATENTED JUN 18 1974          3,817,305

CUTTER TIP

BACKGROUND OF THE INVENTION

In lumber mills, a log is debarked and shaped by a profile cutter. The generally round log is thus converted into a plurality of stepped, generally perpendicular faces to enable it to be cut into lumber thereafter. Thus, profile cutters are applied around the edge of the log to reshape it. The profile cutters typically have a width of two and one sixteenth, two and one fourth or two and five eights inches. They cut a lengthwise profile which enables the log to thereafter be separated into individual lumber. As a consequence, it will be understood that profile cutters remove a substantial quantity of wood and to this end, they tend to wear badly. Quite often, the profile cutter apparatus must be removed from operation, all the profile cutter heads removed, and the blades resharpened. As presently constituted, the blades are carried in a rather oddly shaped head which has lobes serving as counterbalances. The cutting blade is removed and is sharpened on a grinding mechanism. They are very difficult to grind to a sharp edge inasmuch as they require grinding on two or three separate faces. Moreover, the grinding requires the use of a skilled craftsman. The time required for the grinding is quite extensive, even for a very skilled grinder operator. In further particular, the grinding apparatus is quite expensive, easily costing more than Ten Thousand Dollars for the grinder and the various jigs and holders necessary to grind the cutter edges of the prior art equipment.

The present invention overcomes these objections by providing a cutting tip which is readily removable and which can be easily dressed on a grinder. It is dressed only on one face. The single face is dressed until a sharp edge is defined at its intersection with one of the two curved surfaces which define the cutter. The two curved surfaces are preferably segments of concentric circles. In other words, the cutter tip of the present invention is formed of a portion of cylindrical stock. It can be cut from cylindrical stock or it can be die cast or forged to this shape.

SUMMARY OF THE PRESENT INVENTION

The present invention incorporates a cutting tip which can be easily dressed. The cutting tip is defined by two curved surfaces which are preferably segments or arcs of a pair of concentric circles so that the cutting tip of the present invention is fabricated from circular stock. A single face cuts across the two curved surfaces. The single face is ground to define a sharp cutting edge at its intersection with one of the two curved surfaces. The single face is preferably a planar face so that grinding or dressing of this is achieved quite readily without requiring a highly skilled operator or expensive equipment. The cutting tip of the present invention also includes either openings or slots enabling bolts to be fastened through it to fix it in position in a cutting head.

DESCRIPTION OF THE PREFERRED EMBODIMENT

Figure 1:
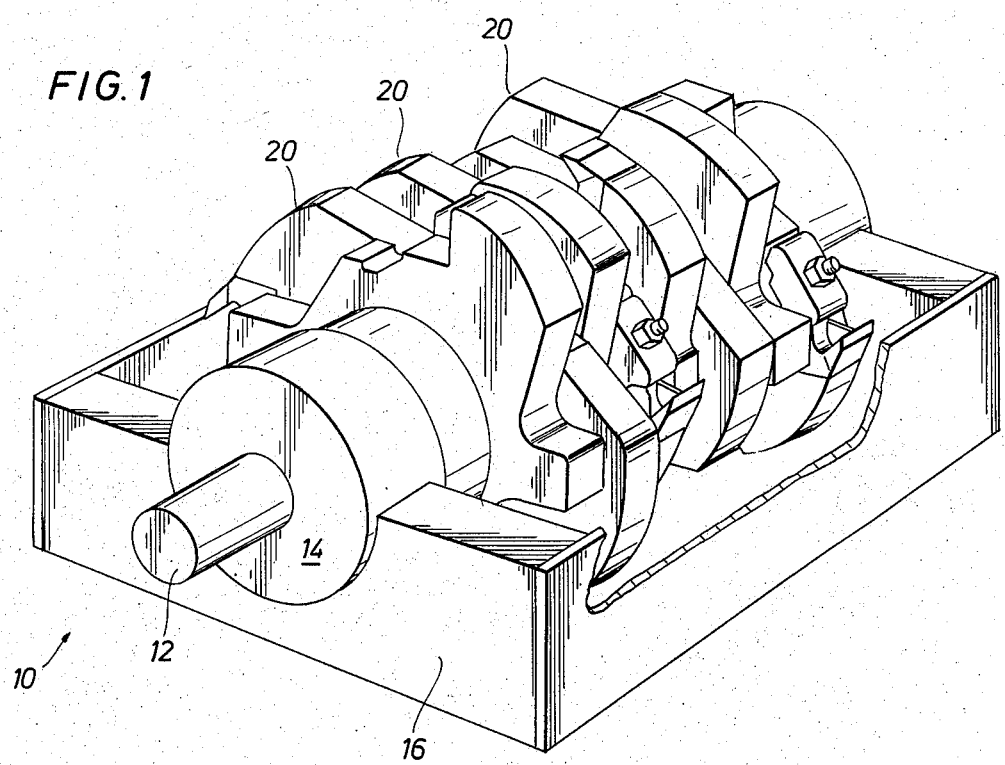
FIG. 1 is a perspective view showing several cutting heads installed in a profiling apparatus utilizing the cutting tips of the present invention.

Attention is first directed to FIG. 1 of the drawings where the numeral 10 identifies profiling apparatus in general. A shaft 12 which is rotated by a suitable prime mover extends through a bearing 14 which is received in a pillow block 16. The shaft supports a plurality of cutter heads which are indicated by the numerals 20. The cutter heads have differing widths and different diameters. To this end, they will shape part of the exterior of a round log forming the log into a number of generally perpendicular faces having the nominal width or depth of most cuts of wood. For instance, the faces may all be two or four inches wide to convert the log into a number of two by fours or four by fours. In any case, the shaft 12 rotates the cutting heads 20. They are all supported within additional apparatus which comprises supporting structure for the present invention.

Figure 2:
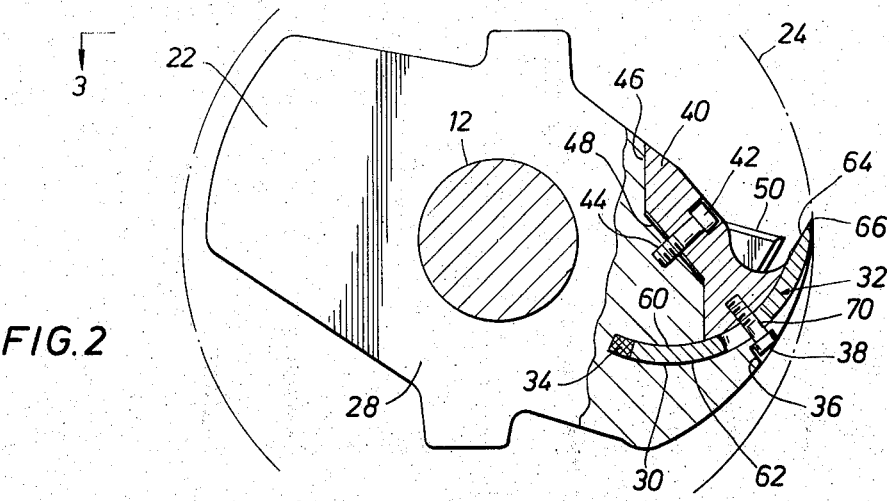
FIG. 2 is a side view of a single cutting head incorporating the cutting tip of the present invention and a counterbalanced rotating head; and, FIG. 3 is a sectional view along the line 3 — 3 of FIG. 2 showing the inclusion of a chip splinter which is a blade at right angles for cutting the chips in half.

Attention is directed to FIG. 2 of the drawings where the shaft 12 is shown supporting an individual cutter head. The cutter head includes a counterbalance portion 22 at the left hand side opposite the cutting portion on the right hand side. The numeral 24 identifies the path of the cutting edge as will be described. It will be observed that no other portion of the cutting head 20 approaches the path. In other words, the counterweight 22 swings on a shorter radius than the radius of the cutting edge.

The cutting head 20 is formed of a single body in the preferred embodiment, which body is indicated by the numeral 28. It is generally installed on the shaft while different cutting edges are inserted or removed as they wear. The body 28 has a width which corresponds to the nominal width of lumber, such as four inches. To this end, a slot 30 is formed in the body 28. The slot 30 is adapted to receive the cutter edge of the present invention. The slot 30 is a portion of a circle. In other words, it has its own center and radius and the center and radius are so located such that the slot 30, if extended, will intersect the circle 24 at a slight angle, an angle perhaps in the range of 3° to 30°. The angle need not be too abrupt. The slot 30 has a finite width, perhaps in the range of three sixteenths of an inch to about four eights of an inch. The slot 30 as sufficient arcuate length to receive a cutter insert of perhaps three to six inches in total arcuate length. The cutting tip of the present invention is indicated by the numeral 32 and is received within the slot 30. Inasmuch as portions of the cutting tip 32 can be ground away during its long life and service, it may not reach to the bottom of the slot 30. To this end, filler material is placed in the slot and is indicated by the numeral 34. One form of filler material is shim stock. Another form is babbitt which can be readily melted, placed in the slot and subsequently removed. It serves as a spacer to position the cutting edge at the proper point, intersecting on the circle 24 as will be described.

A countersunk opening is formed at 36 and is adapted to receive a bolt 38 therein. If the cutting head is quite wide, two or three bolts can be used but such additional bolts would be obscured in FIG. 2. A lock 40 is positioned on the forward side of the cutting edge 32. The block 40 is also anchored in position through the use of a bolt 42 which is threaded into a tapped opening 44 in the body 48 of the rotating head 20. The bolt 42 extends through the locked block and anchors it in position. As viewed in FIG. 2, it will be observed that the cutting head rotates in a counterclockwise manner. The lock block 40 contacts against faces 46 and 48 on the body 28. The counterclockwise rotation, of course, forces the lock block towards the cutting tip 32. It tends to wedge against it because of the rotation and firmly secures the cutting tip in position. The bolt 38 extends partly through the body 28 and into the locked block. Thus, the cutting edge 32 and the lock block 40 are joined together and by virtue of the rotation described above, tend to stay with the cutting head and the chance of their flying off from the equipment is remote indeed.

Figure 3:
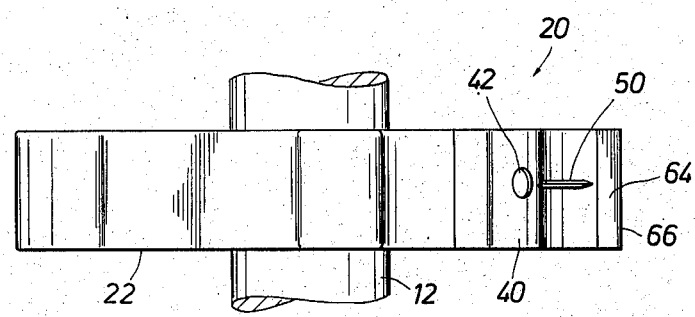

The lock block 40 receives and supports a chip splinter 50 which is better shown in FIG. 3. For instance, if the profile cutting head 20 is 4 inches wide, it will tend to cut a chip which is four inches wide. The chips have resale value. They are preferably equally sized and to this end, they are divided in half or thirds through the use of a chip splinter of the sort shown in the drawings. More than one can be used.

The cutting tip 32 of the present invention should be noted in great detail. It is preferably formed of cylindrical stock. For instance, it can be a portion cut from tubular goods. A suitable grade of material is tool steel or carbide. As a matter of fact, the preferred material probably exceeds a Rockwell C hardness of 50 or harder. It can be formed by cutting from cylindrical stock or can be formed by die casting to the same shape. The cutting tip 32 has a pair of faces 60 and 62. The faces 60 and 62 are preferably arcs of concentric circles. That is to say, the cutting tip is of equal thickness along its length. Moreover, this enables it to be slidably positioned in the slot 30 as it feeds towards the circle 24 as portions of it are ground away over extended periods of use. The cutting tip 32 of the present invention preferably has one ground face which is indicated by the numeral 64. It is a planar face which extends from the inside face or surface 60 to the outside surface 62. It preferably intersects the outside surface 62 to define a single cutting edge at 66. The cutting edge at 66 is then positioned at the circle 24 as shown in FIG. 3. This positioning can be achieved by loosening the bolt 38 and adjusting the amount of shim stock at 34. Once the cutting tip if positioned with the edge 66 on the circle, it can then be fixed in position by tightening the bolt and supplying the necessary quantity of shim stock or babbitt in the slot 30.

The dressed face 64 is preferably planar for ease of grinding. For instance, it can be positioned easily adjacent to a grinding head which grinds a flat surface. No compound curves are ground. Moreover, the intersection with the outer surface 62 forms the edge 66 which again is ground quite simply and straightforwardly. There is no need to grind from the outer surface inwardly. In other words, only one surface is ground, thereby easing the preparation of the cutting head for reuse.

The bolt 38 extends through a slot 70 in the cutting tip. The slot 70 may extend all the way to the remote edge of the cutting tip. This then permits the insert of the present invention to be advanced repeatedly until the slot 70 is in the vicinity of the ground face 64. At that juncture, the blade has been fully used or consumed and can be discarded.

The foregoing is directed to the preferred embodiment but the scope thereof is determined by the claims which are as follows.

I claim:

1. For use in a profile cutting head wherein the head is adapted to be mounted on a shaft and rotates about the shaft and supports a cutter for cutting a profile in a log and the profile head has a counterbalanced portion enabling the cutting head to rotate smoothly, the improvement comprising a cutting tip which is adapted to be removed and replacably locked in position, the cutting tip incorporating a cutting edge defined by an outer curved surface thereof and a single dressed face which intersect to form the cutting edge, and means on said head for positioning the cutting edge at a cutting position.

2. The apparatus of claim 1 including a slot formed in said cutting head for receiving said cutting tip therein, said slot being adapted to receive filling material as said cutting edge is advanced.

3. The apparatus of claim 2 including a chip splitter positioned at an angle with respect to said cutting edge.

4. The apparatus of claim 1 including said cutting tip is formed as a body defined between a pair of surfaces which are arcs of concentric circles and said single dressed face intersects at least one of said arcs.

5. The apparatus of claim 1 including a lock block which is releasably held to said head and which clamps said cutting tip in position.

6. The apparatus of claim 1 including an opening means in said cutting tip for receiving a fastening means therein to adjustably and releasably position said cutting tip to said head.

7. The apparatus of claim 2 wherein said slot encompases a portion of a circle.

8. The apparatus of claim 2 including babbit filling material.

9. The apparatus of claim 3 including a separable block mounting said chip splitter perpendicular to said cutting edge.

* * * * *